Figures 1, 2:
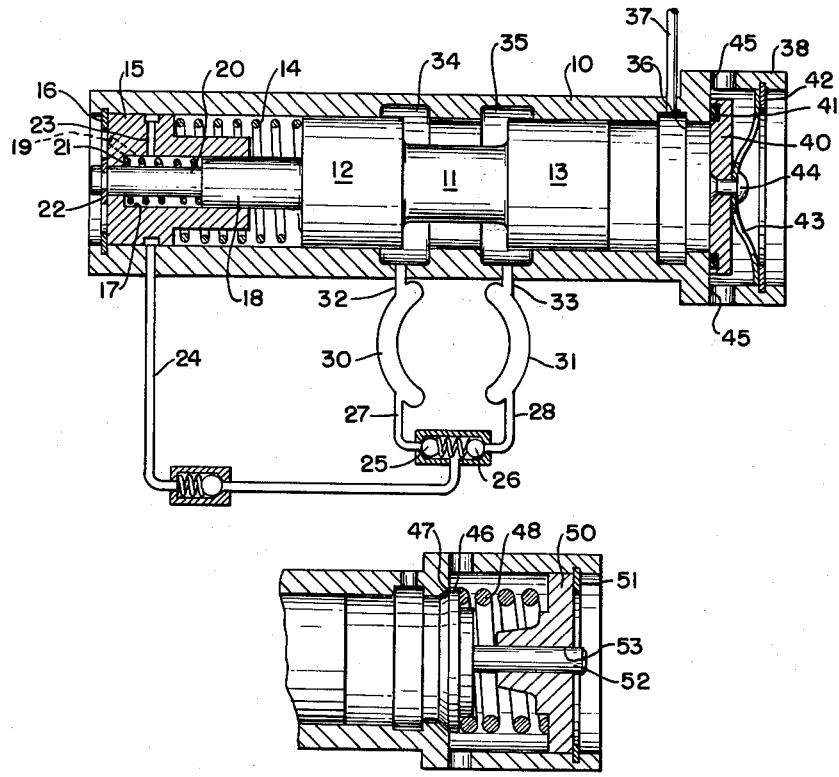

March 16, 1965 C. W. LAUBIN 3,173,440

VALVE CONSTRUCTION

Filed Feb. 26, 1962

INVENTOR.
CLARENCE W. LAUBIN

BY
*Darby & Darby*

ATTORNEYS

United States Patent Office 3,173,440
Patented Mar. 16, 1965

3,173,440
VALVE CONSTRUCTION
Clarence W. Laubin, Huntington, N.Y., assignor to Fairchild Hiller Corporation, a corporation of Maryland
Filed Feb. 26, 1962, Ser. No. 175,523
7 Claims. (Cl. 137—108)

The present invention relates to valve constructions and particularly to the construction of a bypass valve for a hydrostatic transmission which valve incorporates an auxiliary relief valve operable under conditions in which the pressure in the main valve exceeds a predetermined limit.

It is an object of the invention to provide a bypass valve for use with a hydrostatic transmission which incorporates a pressure relief valve, the entire structure beng compact and requiring a single housing.

It is another object of the invention to provide a valve such as that mentioned above wherein the pressure relief portion is directly operated by the pressure in the chamber to which controlled pressure fluid is supplied.

Other objects and features of the invention will be apparent when the following description is considered in connection with the annexed drawings, in which, FIGURE 1 is a cross-sectional view of the valve of my invention. This view also illustrates the ports through which fluid passes from a hydrostatic pump to its motor or motors and the arrangement whereby the pressure in the high pressure line is utilized to modify the valve operation; and FIGURE 2 is a fragmentary cross-sectional view of the valve of FIGURE 1 showing a modified construction of the pressure relief valve.

In a hydraulic transmission comprising one or more hydraulic pumps and one or more hydraulic motors it is desirable to short circuit the pump and thereby disconnect the motor from the driving fluid in order to provide for "slip." The bypass valve is normally in open position when the vehicle is stationary and is closed as the prime mover torque output increases thereby rendering it possible to start the vehicle in motion smoothly.

A detailed description of the usual bypass valve and its mode of operation is given in the copending application of John Hollowell, Serial Number 175,522, filed concurrently herewith. In addition, a general description of my improvement comprising the incorporated relief valve is given in that the application with the bypass valve there shown being identical with that here shown. No claim to the valve incorporating the relief feature is included in that application.

Referring now to the drawings, there is shown in FIGURE 1 a bypass valve comprising a housing 10. In the housing 10 there is mounted a valve spool 11 having the two piston members 12 and 13. The spool 11 is urged to the right by compression spring 14 which bears against the left end of spool 11 and against a cylinder 15 which in turn is limited in its leftward movement by means of a retaining washer 16 which also serves as a seal.

Cylinder 15 is provided with a central bore 17 in which there is mounted a piston 18 which bears against the left hand end of piston 12. The piston 18 is provided with a reduced shank portion 20 which is surrounded by a compression spring 21 which thus serves to urge piston 18 to the right. A retaining ring 22 limits the movement of piston 18 to the right. As indicated by the dotted bleed port 19 there is a slight leakage about the piston shank 20 so that pressure built up behind the piston 18 and be dissipated.

A conduit 23 in the cylinder 15 communicates with the space behind, that is, to the left of piston 18, this conduit likewise communicating with a pipe 24. Pipe 24 communicates with a pair of check valves 25 and 26 and by means of pipes 27 and 28 with the ports 30, 31 of a hydrostatic pump-motor interconnection. Likewise communicating with the ports 30 and 31 respectively are conduits 32 and 33 which in turn communicate with the grooves 34 and 35 in the interior of the housing 10 adjacent the pistons 12 and 13 respectively.

Communicating with a groove 36 in the housing 10 is a pipe 37 through which control oil at a regulated pressure is fed. In its open position it will be seen that valve spool 11 permits communication from the high pressure port 30 to the low pressure port 31 so that the hydrostatic pump is "short circuited" and the motor is not driven. As the pressure in control line 37 increases, the spool 11 moves to the left closing off the pipe 33 and thereby shutting the bypass causing oil from the pump to be directed to the cooperating motor. The check valves 25 and 26 are set to open at a predetermined pressure and if the pressure in the high pressure port 30 (or when operating in reverse in the port 31 which will then be the high pressure port) exceeds a predetermined limit, that pressure is transmitted through the pipe 24 to the bore 17 thus forcing the piston 18 to the right and reopening the bypass to thereby reduce the pressure in the high pressure line.

The system as thus far described is satisfactory for normal load fluctuations. However, in the event that the manually operable ratio control member is inadvertently shifted to position bringing about radically different conditions, such for example as inadvertent shifting from a positive swash plate angle to a negative swash plate angle, the working pressure in the hydraulic pump-motor system will rise extremely rapidly. Spool 11, however, can only move by displacing the control oil in the line 37 and chamber 36 back through the control line against the control pressure, and because of this the tendency for the spool to move rapidly as described above is counteracted. The result is that the slow opening of the bypass may permit pressure in the hydrostatic system to rise to the extent that damage is done to the system.

I incorporate a relief valve in an enlarged portion 38 of the housing 10. This valve comprises a disk 40 having an annular sealing ring 41 in its left hand face which sealing ring seats against the surface formed by the juncture of the enlarged bore in housing portion 38 with the smaller bore in housing 10. Disk 38 is retained in position by means of a retaining ring 42 to which is attached a resilient spider member or diaphragm 43. Spider member 43 is attached at its center by means of a rivet or other suitable fastening 44 to the disk 40.

Thus when the pressure rises rapidly in the hydrostatic system the spool 11, instead of being forced to travel slowly due to the build-up of pressure in the control oil chamber 36 and communicating conduit 37, is permitted to move rapidly since the control oil pressure is relieved due to movement of the disk 40 away from its seat thus permitting oil to pass into the housing portion 38 from which it may be dissipated as for example by returning to the oil sump through the ports 45.

It will be seen that by this arrangement damage to the hydrostatic system resulting from inadvertent shifting of the swash plate angles is prevented since a large flow of control oil is permitted by the relief valve. It will be understood that the spring pressure exerted by the resilient spider 43 is predetermined so that this relief valve opens only when the rise in pressure in the control chamber would result in such slow opening of the bypass as to result in dangerous pressures in the hydrostatic system.

Referring now to FIGURE 2, it will be seen that in that figure the relief valve comprises a valve disk 46 which has a tapered edge cooperating with a valve seat 47. Disk 46 is normally held against its seat by a compression spring 48 which extends between block 50 and the disk, block 50 being held in position by a retaining ring 51. The valve disk is guided by means of a shank 52 fixed to the disk and slidably mounted in bore 53 in block 50.

While I have described preferred embodiments of my invention, it will be understood that I wish to be limited not by the foregoing description, but solely by the claims granted to me.

What is claimed is:

1. A valve for bypassing the connections from the pump to the motor of a continuously variable hydrostatic transmission of the type having a motor unit and a pump unit, the hydraulic circuit from the pump to the motor being normally completed through a porting member, said circuit being bypassed by the bypass valve, comprising in combination, a housing having a bore, a spool comprising two joined piston portions in said housing bore, ports in said housing located between said piston portions when said spool is in bypassing position, to thereby bypass the hydraulic circuit to said motor connections from said ports to a pair of check valves and from the common output of said check valves to the opposite side of one of said piston portions, a leakage path from said opposite side to atmosphere, an inlet port in said housing providing control pressure to the opposite side of the other piston portion and a relief valve formed in said valve housing at the side of said other piston portion at which said control pressure port is located, said relief valve serving to relieve back pressure when said valve spool moves rapidly to bypassing position.

2. A valve in accordance with claim 1 wherein said relief valve comprises an enlarged bore in said housing forming a shoulder on the opposite side of said control pressure port from said other piston portion, a disk seating against said shoulder, resilient means urging said disk against said shoulder and at least one port connecting said enlarged bore to atmosphere.

3. A valve in accordance with claim 1, said relief valve comprising an enlarged bore in said housing forming a shoulder on the opposite side of said control pressure port from said two piston portions, said shoulder portion being formed with a bevelled edge where said bore meets said enlarged bore, a disk having a bevelled edge mating with said shoulder edge, resilient means urging said bevelled disk into mating engagement with said bevelled shoulder and at least one port connecting said enlarged bore to atmosphere.

4. A valve in accordance with claim 2 wherein said disk has an annular ring of sealing material fixed thereto on the side facing said shoulder, said ring sealing against the plane surface of said shoulder.

5. A device in accordance with claim 2 wherein said resilient means comprises a spider of spring material fixed to said disk, said spider being bowed, a groove in the enlarged portion of said bore and a ring in said groove against which said bowed spider seats.

6. A valve in accordance with claim 2 wherein said resilient means comprises a coil spring bearing against said disk, a groove in said enlarged bore, an annular ring in said groove, a block mounted in said bore and held in position by said ring, said block confining said coil spring at the end opposite said disk.

7. A valve in accordance with claim 6 wherein said valve disk has a central spindle formed thereon and said block has a central aperture therein in which said spindle is guided to thereby define the line of movement of said valve disk.

References Cited in the file of this patent

UNITED STATES PATENTS

| | | |
|---|---|---|
| 2,002,451 | Gray | May 21, 1935 |
| 2,402,115 | Levy | June 11, 1946 |
| 2,935,999 | Hock | May 10, 1960 |